Oct. 5, 1937.    R. S. SANFORD    2,094,824
VEHICLE
Filed Nov. 9, 1934    4 Sheets-Sheet 3

INVENTOR.
Roy S. Sanford
BY
*Jn. W. McConkey*
ATTORNEY.

Patented Oct. 5, 1937

2,094,824

UNITED STATES PATENT OFFICE 2,094,824

VEHICLE

Roy S. Sanford, New York, N. Y.

Application November 9, 1934, Serial No. 752,239

15 Claims. (Cl. 280—95)

This invention relates to vehicles, and is illustrated as embodied in an automobile having novel individual spring suspensions for its wheels, and preferably also a novel steering mechanism compensating automatically for movements of said spring suspension.

A general object of the invention is to avoid the difficulties inherent in most spring suspensions, such as the gyroscopic effects of tilting movements of the wheels and changes in tread or wheel base due to vertical movements of the wheels, by constraining the wheel to move substantially in a straight-line path. I believe that all devices heretofore suggested for constraining the wheel to move in a straight-line path have involved the use of slides or the like, working with considerable friction and which are expensive to manufacture and almost impossible to keep from wearing enough to rattle.

An important object of the invention, then, is to provide members having a pivotal instead of a sliding motion, and which constrain the wheel to move vertically in a straight-line path relatively to the chassis which it supports. Preferably these members are provided with means automatically operated by the vertical wheel movement to change the effective length of said members to compensate for the wheel movements and hold the wheel in its straight-line path.

In the arrangement which I consider the best and simplest, each of these members has at one end a pivot forming one connection, and has at its other end another pivotal connection which includes surfaces in rolling engagement with each other and one of which is curved (cylindrically) about a center in the axis of said pivot. It will be seen that, as this type of member is rocked angularly by vertical movement of the wheel, at all times keeps the direct horizontal straight-line distance from the pivot axis to the point of engagement of the rolling surfaces a constant quantity, and therefore constrains the wheel to move in a straight-line path relatively to the body.

Where used as part of the steering mechanism, these novel members form the drag-links connecting the steering gear on the chassis to the supports or knuckles of the two front wheels. In this case I prefer to provide blocks of nonmetallic yielding material such as rubber, or springs, or both, holding the rolling surfaces in engagement. The connection including the rolling parts and the rubber or springs also embodies in itself substantial novelty, as hereinafter more particularly described.

In the arrangement illustrated in the drawings the same principle is embodied in individual spring suspensions for the wheels. In this case I prefer to provide upper and lower arms pivoted to the wheel supports or knuckles, and having at their inner or chassis ends the described novel connections with parts in rolling engagement.

In this case I prefer to hold these rolling parts together by compressed yielding blocks of nonmetallic material such as rubber, which therefore acts yieldingly to resist downward movement of the chassis, so that these blocks and their associated arms form an effective and simple individual spring suspension for the wheel.

Since the effective horizontal lengths of the arms remains at all times constant, and the wheel moves in a straight-line vertical path, it is not necessary that the upper and lower arms be parallel, or of the same length. I therefore prefer to arrange them at different angles to the chassis, to brace the wheel as far as possible against shocks in all different directions.

The above and other objects and features of the invention, including various novel combinations of parts and desirable particular constructions, will be apparent from the following description of the illustrative embodiment shown in the accompanying drawings, in which.

Figure 1:
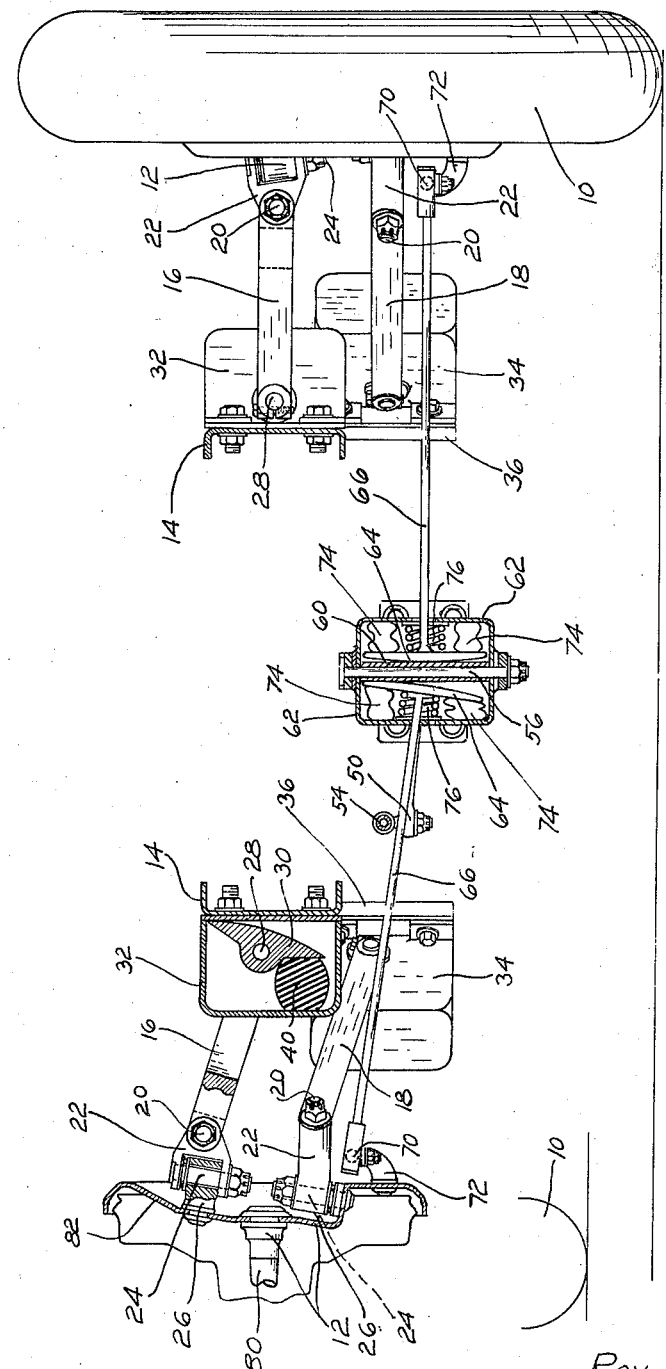
Figure 1 is a transverse vertical section through an automobile, substantially in a plane including the swiveling axes of the two front wheels.

The illustrated vehicle comprises front road wheels 10, rotatably mounted on swiveled knuckles 12, and yieldingly supporting a chassis which may be of any desired construction and which is shown as including a chassis frame 14.

The chassis frame 14 is supported on the wheels 10 by novel spring suspensions individual to the two wheels, and each shown as including upper and lower bifurcated arms 16 and 18. The arms 16 and 18 are connected by horizontal pivots 20 to joint members 22 which in turn are connected by generally vertical coaxial pivots 24 to bosses 26 secured to or integral with the knuckle 12. The axis of pivots 24 intersects the road surface at or near the intersection therewith of the load plane of the wheel, as shown at the left side of Figure 1, and may be inclined in the usual manner as shown.

The arms at the bifurcated end of each of the arms 16 and 18 are shown keyed or splined or otherwise made rigid with a shaft 28 which is rigid in turn with a part or shoe 30 having a surface cylindrically curved about a center in the axis of the corresponding pivot 20. This surface is in rolling engagement with a plane vertical surface on a part secured to the frame 14, and shown as one side of a box structure 32 (for arm 16) directly secured to frame 14, or a generally similar box structure 34 secured to a bracket 36 mounted on the frame 14 (for arm 18).

Figure 5:
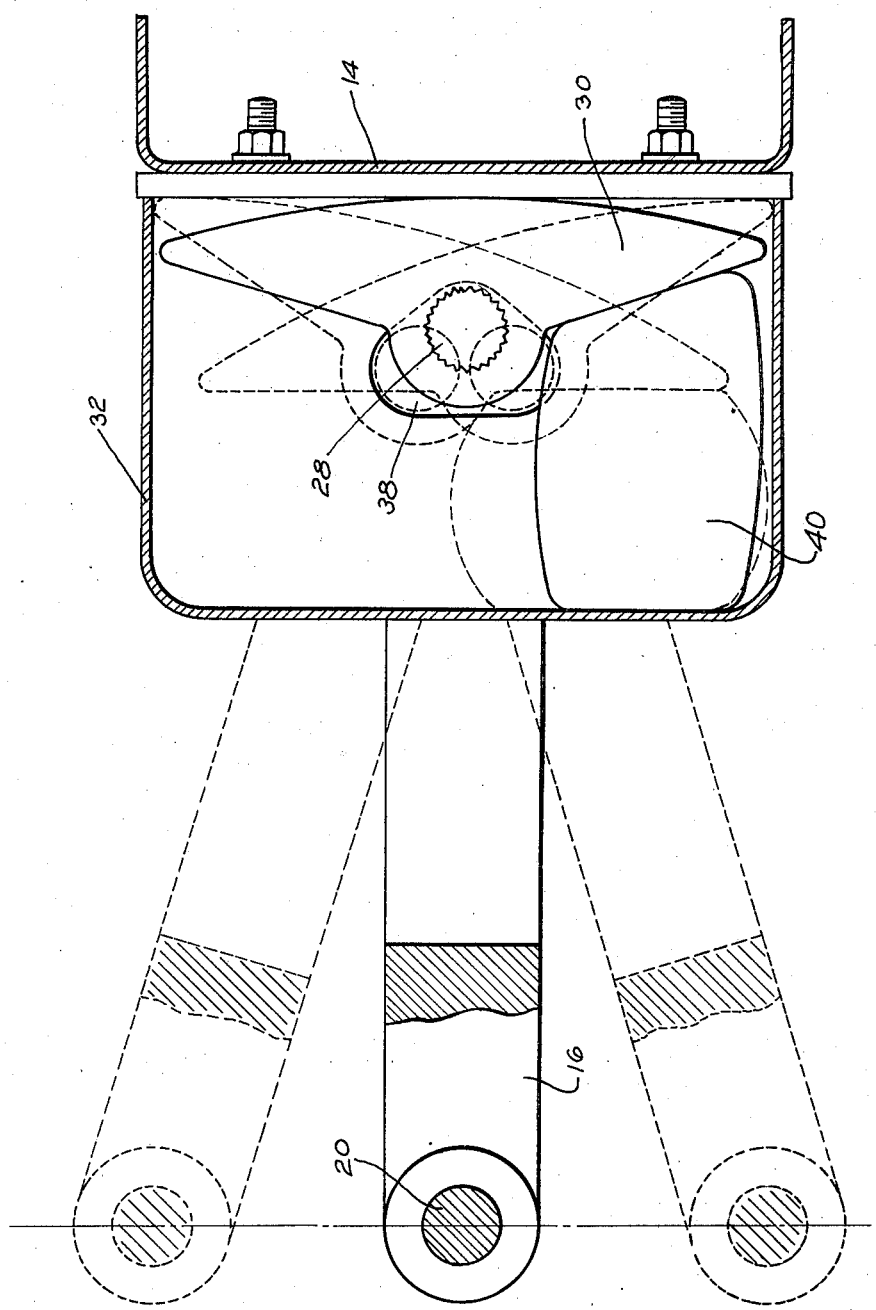
Figure 5 is a diagram showing on a relatively large scale the arrangement of one of the spring suspension arms, being a transverse vertical section substantially centrally through said arm.

Each of the box structures 32 and 34 houses the corresponding shoe 30, and has in its side a generally triangular opening 38 (Figure 5) for the corresponding shaft 28. Each structure also preferably houses yielding means, shown as a block 40 of nonmetallic material such as rubber, which holds the shoe 30 against its plane surface, and which also resists downward motion of the chassis frame 14 relatively to the wheel.

Thus arms 16 and 18 and their associated parts, including the rubber block 40, form a spring suspension individual to the corresponding wheel.

As the wheel and chassis frame 14 move relatively to each other (see Figure 5) and shoe 30 rolls accordingly on the corresponding plane vertical surface, compressing the rubber block 40 more or less, the horizontal direct straight-line distance from pivot 20 (and therefore from the wheel) to the frame 14 remains at all times constant. The wheel therefore is constrained to move at all times in a straight-line path.

Figure 2:
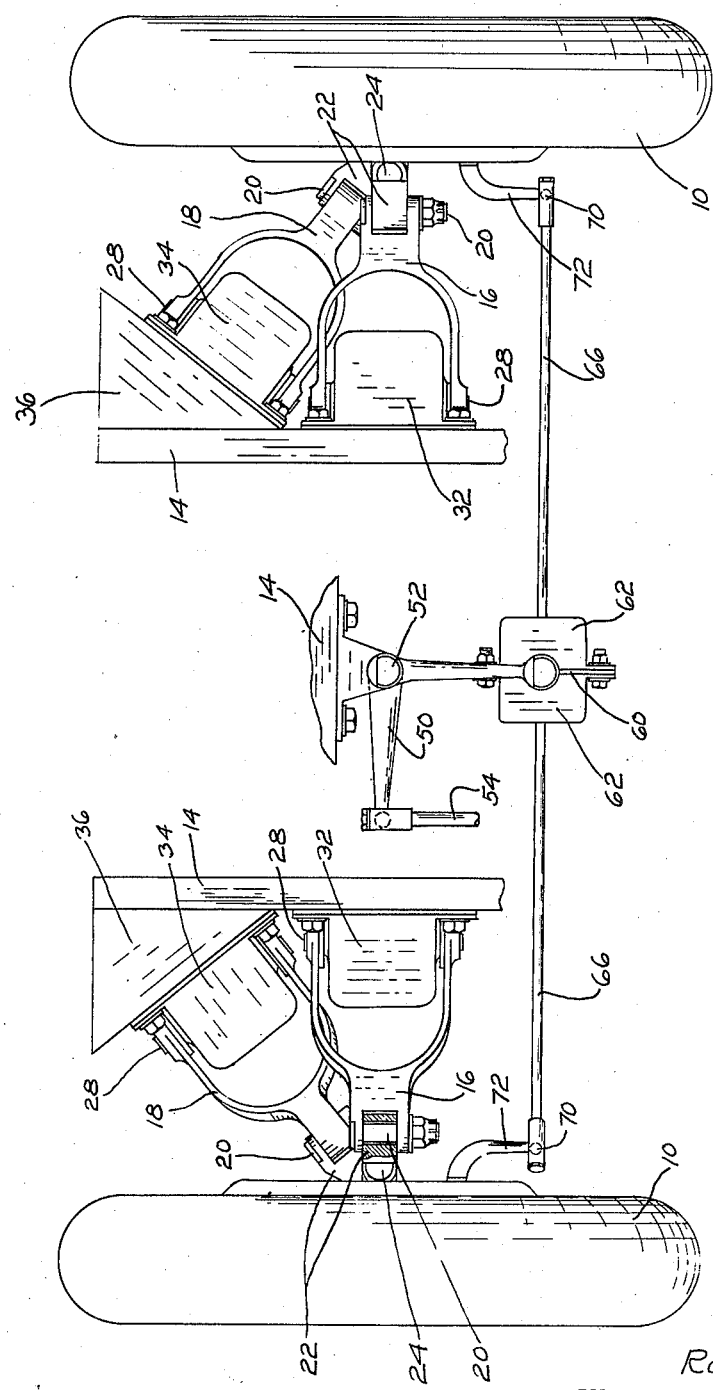
Figure 2 is a top plan view of the front end of the automobile, showing substantially the same parts as Figure 1.

Since the movement of the wheel is in such a path, arms 16 and 18 need not be of the same length, and need not be parallel. They may therefore be arranged at whatever angles will best brace the wheel against road shocks. I prefer to arrange the upper arms 16 substantially at right angles to the frame 14, and to incline the lower arms 18 forwardly (see Figure 2), making the brackets 36 of a corresponding shape, to brace the wheels against shocks in the direction of vehicle travel.

In a vehicle having a spring suspension of this character, it is very desirable to have a steering gear which is insensitive to the movements of the wheels, and I prefer to accomplish this by embodying in the steering mechanism connections operating according to the principles discussed above.

Figure 4:
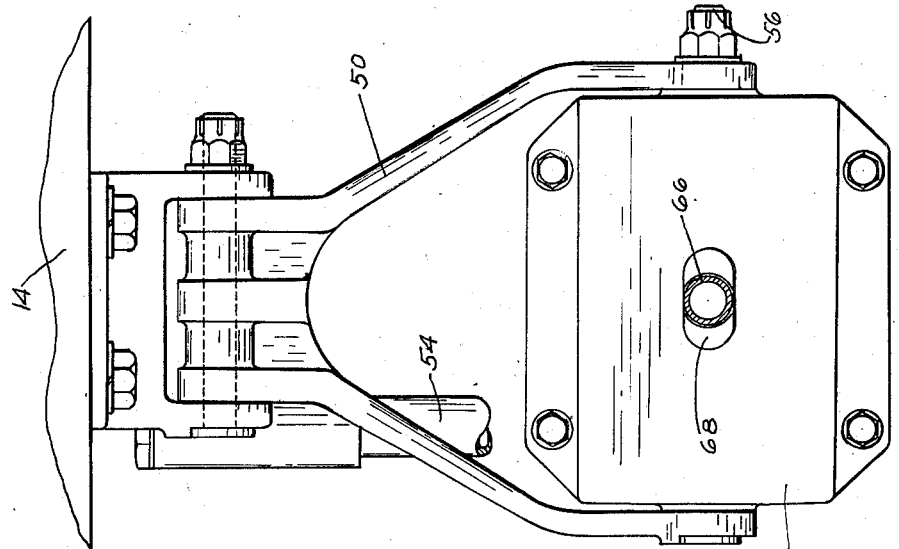
Figure 4 is a side elevation of the parts shown in Figure 3, looking from right to left.
Figure 3:
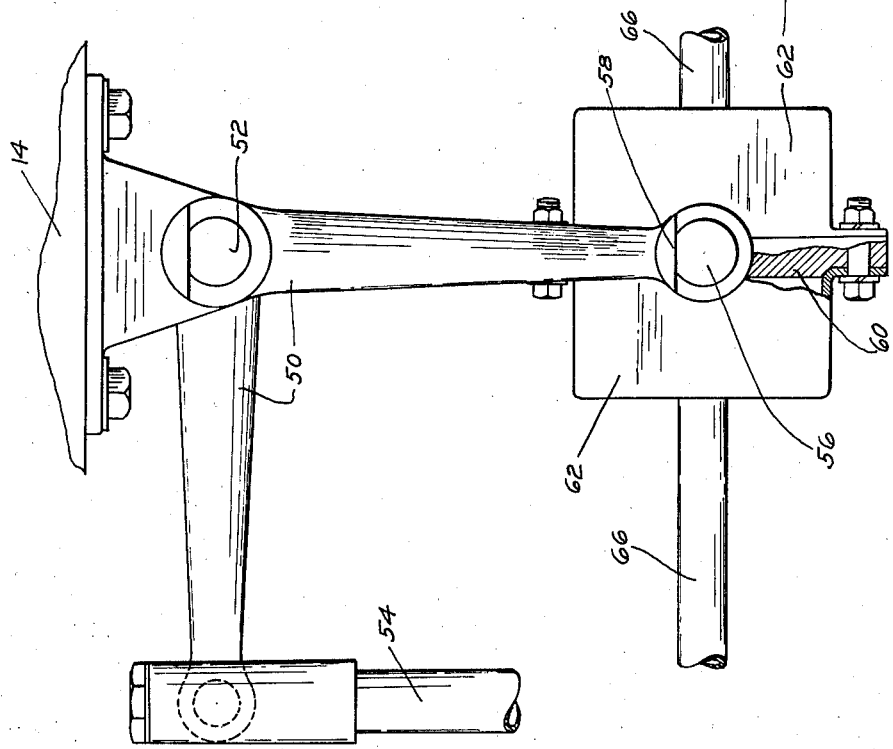
Figure 3 is a plan view, on a larger scale than Figure 2, of the steering arm and its connection to the drag-links.

In the illustrated arrangement, a steering arm or bellcrank 50, mounted on a vertical pivot 52 centrally mounted on the chassis frame 14, is universally connected or jointed to a link 54 or the like extending to any suitable steering gear of any desired type (not shown). As best shown in Figure 4, the operating arm of bellcrank 50 is bifurcated to provide two arms splined or keyed at their extremities to a shaft 56. As shown in Figure 3, these arms of lever 50, and the shaft 56, may have flat surfaces interengaging at 58 to prevent the shaft from turning.

As will appear by comparison of Figures 1 and 3, the shaft 56 is journaled in a vertical bearing formed in a central partition 60, to which are bolted two cup-shaped steel stampings 62, thereby forming a double housing for two shoes 64 rolling against the opposite sides of the partition 60.

The shoes 64 are integrally formed at, or rigidly secured to, the ends of drag links 66 extending through openings 68 in the cup-shaped stampings 62, and having at their opposite ends the usual ball-and-socket joints or pivots 70 pivotally and universally connecting them to steering arms 72 rigidly connected to the steering knuckles 12. The shoes 64 have their rolling surfaces cylindrically curved, or if preferred spherically curved, about centers at the centers of the joints 70.

Blocks 74 of resilient non-metallic material such as rubber are compressed between shoes 64 and the caps or stampings 62, and I prefer also to provide coil springs 76 sleeved on the drag links 66 and compressed between the shoes 64 and the caps or stampings 62.

It will be seen that, with the described arrangement, the effective horizontal straight-line lengths of the drag-link connections 66—64 remains constant as the wheels rise and fall.

As shown at the left in Figure 1, if desired the knuckles 12 may be built up by securing the wheel spindle 80 and the bosses 26 and the steering arm 72 rigidly to a very heavy stamped backing plate 82 forming part of the usual front brake mechanism.

While one illustrative embodiment has been described in detail, it is not my intention to limit the scope of the invention to that particular embodiment, or otherwise than by the terms of the appended claims.

I claim:

1. A vehicle having a road wheel, a support on which said wheel is rotatably mounted, and chassis means supported by and movable vertically relatively to said wheel and support, in combination with means connecting said chassis means and said support and constraining said relative movement into a straight-line path and which comprises a rigid member having a pivot at one end and having at its other end a rolling engagement part formed on an arc having its center of curvature in the axis of said pivot.

2. A vehicle having a road wheel, a support on which said wheel is rotatably mounted, and chassis means supported by and movable vertically relatively to said wheel and support, in combination with pivotally-connected members connecting said chassis means and said support, said members being provided with means maintaining their horizontal effective lengths substantially constant as they swing up and down, whereby to constrain said relative movement into a straight-line path.

3. A vehicle having a support with a wheel rotatably mounted thereon, a chassis yieldingly mounted on said support by means permitting vertical relative movement of said support and said chassis in a straight-line path, and a steering gear mounted on said chassis having a drag link connecting it to said support, the connection at one end of the drag link being a pivot and that at the other end including surfaces held in rolling contact and one of which is curved about a center in the axis of said pivot.

4. A vehicle having a support with a wheel rotatably mounted thereon, a chassis yieldingly mounted on said support by means permitting vertical relative movement of said support and said chassis in a straight-line path, and a steering gear mounted on said chassis having a drag link connecting it to said support, the connection at one end of the drag link being a pivot and that at the other end including surfaces held in rolling contact and one of which is curved about a center in the axis of said pivot, said connection at said other end also including non-metallic material yieldingly compressed by the rolling of one of said surfaces on the other and holding said surfaces in contact.

5. A vehicle having a support with a wheel rotatably mounted thereon, a chassis yieldingly mounted on said support by means permitting vertical relative movement of said support and said chassis in a straight-line path, and a steering gear mounted on said chassis having a drag link connecting it to said support, the connection at one end of the drag link being a pivot and that at the other end including surfaces held in rolling contact and one of which is curved about a center in the axis of said pivot, said connection at said other end also including yielding means holding said surfaces in contact.

6. A vehicle having a support with a wheel rotatably mounted thereon, a chassis yieldingly mounted on said support by means permitting vertical relative movement of said support and said chassis in a straight-line path, and a steering gear mounted on said chassis having a drag link connecting it to said support, the connection at one end of the drag link being a pivot and that at the other end including surfaces held in rolling contact and one of which is curved about a center in the axis of said pivot, said connection at said other end also including a spring holding said surfaces in contact.

7. A vehicle comprising a support on which a wheel is rotatably mounted, a chassis, means connecting the chassis to said support including an arm having a pivot forming a connection at one end to said support, a connection to the chassis at the other end of said arm including surfaces in rolling engagement with each other and one of which is formed on a curve having its center in the axis of said pivot, and means yieldingly holding said surfaces together and yieldingly resisting downward movement of the chassis relatively to said support.

8. A vehicle comprising a support on which a wheel is rotatably mounted, a chassis, means connecting the chassis to said support including a pair of arms arranged one above the other and each having a pivot forming a connection at one end to said support, a connection to the chassis at the other end of each of said arms including surfaces in rolling engagement with each other and one of which is formed on a curve having its center in the axis of said pivot, and means cooperating with said arms and yieldingly holding said surfaces together and yieldingly resisting downward movement of the chassis relatively to said support.

9. A vehicle comprising a support on which a wheel is rotatably mounted, a chassis, means connecting the chassis to said support including a pair of arms arranged one above the other and each having a pivot forming a connection at one end, a connection at the other end of each of said arms including surfaces in rolling engagement with each other and one of which is formed on a curve having its center in the axis of said pivot, and means cooperating with said arms and yieldingly holding said surfaces together and yieldingly resisting downward movement of the chassis relatively to said support, said arms being arranged at different angles relatively to the chassis, to brace the wheel against road shocks in different directions.

10. A vehicle comprising a support for a rotatably-mounted wheel, a chassis, and means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path.

11. A vehicle comprising a support for a rotatably-mounted wheel, a chassis, means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path, and means cooperatively engaging a part of the connecting means and yieldingly resisting downward movement of the chassis relatively to the wheel and with said connecting means forming an individual spring suspension for said wheel.

12. A vehicle comprising a support for a rotatably-mounted wheel, a chassis, and means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path, said parts comprising upper and lower arms connected to the support and the chassis.

13. A vehicle comprising a support for a rotatably-mounted wheel, a chassis, means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path, and means cooperatively engaging a part of the connecting means and yieldingly resisting downward movement of the chassis relatively to the wheel and with said connecting means forming an individual spring suspension for said wheel, said parts comprising upper and lower arms connected to the support and the chassis.

14. A vehicle comprising a support for a rotatably-mounted wheel, a chassis, and means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path, said parts comprising upper and lower arms connected to the support and the chassis, and arranged at different angles to the chassis, to brace the wheel against shocks from different directions.

15. A vehicle comprising a support for a rotatably-mounted wheel, a chassis, means connecting the support and chassis including parts having pivotal movement relatively thereto and arranged to maintain their effective lengths constant during relative vertical movement of the support and chassis in such a manner as to constrain the wheel to move vertically relatively to the chassis substantially in a straight-line path, and means cooperatively engaging a part of the connecting means and yieldingly resisting downward movement of the chassis relatively to the wheel and with said connecting means forming an individual spring suspension for said wheel, said parts comprising upper and lower arms connected to the support and the chassis and arranged at different angles to the chassis, to brace the wheel against shocks from different directions.

ROY S. SANFORD.